Nov. 10, 1936.  W. C. POWELL  2,060,528
DEVICE FOR FACILITATING THE READING OF A SLIDE RULE
Filed Sept. 3, 1935
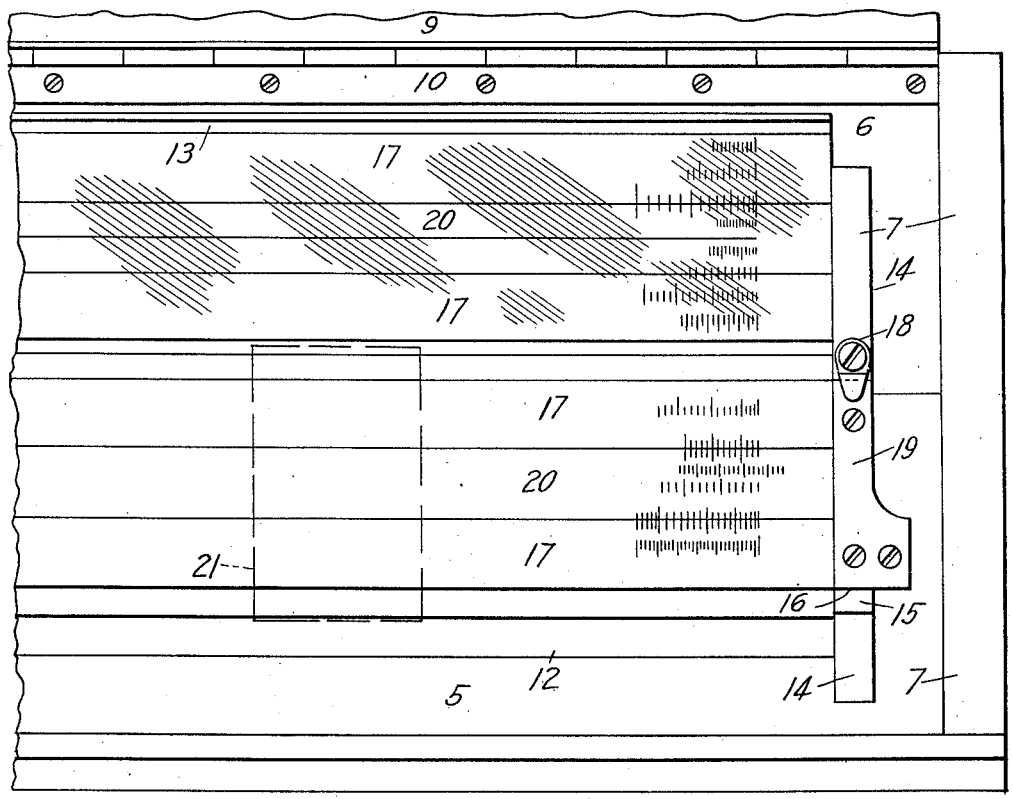
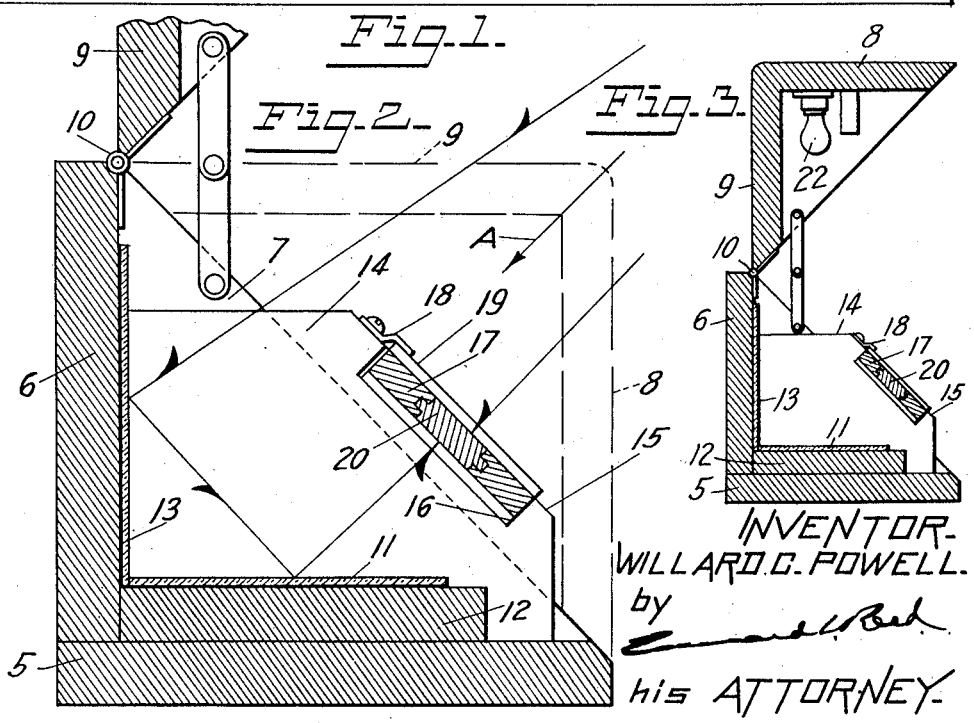
Fig. 1.
Fig. 2.
Fig. 3.
INVENTOR.
WILLARD C. POWELL.
by
his ATTORNEY.

UNITED STATES PATENT OFFICE 2,060,528

DEVICE FOR FACILITATING THE READING OF A SLIDE RULE

Willard C. Powell, Dayton, Ohio

Application September 3, 1935, Serial No. 38,913

8 Claims. (Cl. 88—74)

This invention relates to a device for facilitating the reading of a slide rule, or other article having markings on both sides thereof. The ordinary slide rule is provided with a plurality of longitudinal series of markings or graduations on each side thereof and the slide cooperates with the markings on both sides of the rule in effecting computations. The markings on the rear side of the rule are usually inverted with relation to the markings on the front side so that the rear markings may be brought to the front in reading position by merely turning the rule about a longitudinal axis. In many cases the securing of the desired information involves computations on both sides of the rule and it is necessary to adjust the slide, make one computation and then turn the rule and make the other computation, the slide remaining in the same position for both computations. Not only is the turning of the rule itself an inconvenient operation but inasmuch as only one side of the rule is exposed to view at any one time the computations can be compared or checked one against the other only by memorizing the same or by writing them out. Further, in turning the rule it is very easy to slightly move the slide without knowing it and if this happens the computation is of course inaccurate.

One object of the invention is to provide means whereby the markings on both sides of a slide rule or similar article may be simultaneously exposed to view and read by the operator without imparting any movement to the rule.

A further object of the invention is to provide means for simultaneously exposing both sides of the rule which will in no way interfere with the manipulation of the movable parts of the rule to effect computations.

A further object of the invention is to provide such a device which will reverse the position of the inverted markings on the rear side of the rule and present the same in reading position to the eyes of an operator in front of the rule.

A further object of the invention is to provide such a device which will be simple and inexpensive in construction and which will present the rear markings to the eyes of the operator in clearly defined and legible form.

Other objects of the invention will appear as the device is described in detail.

In the accompanying drawing Fig. 1 is an elevation of a part of an apparatus embodying my invention, viewing the same in the direction of the arrow A on Fig. 2; Fig. 2 is a transverse sectional view of such an apparatus partly broken away; and Fig. 3 is a transverse sectional view of the complete apparatus, on a reduced scale.

In the drawing I have illustrated one embodiment of my invention and have shown the same as designed primarily for use with a slide rule but it will be understood that the device may take various forms and may be used with articles of various kinds having markings on two or more sides thereof. The term "markings" as herein used is intended to include any indications or configurations appearing on two or more sides of the rule; the "front side" means the side which is exposed to the eyes of the observer, or, in the case of a slide rule, to the eyes of the operator; and "rear side" includes any part of the rule or other article which is not directly visible to the operator when he is in a position to view the front side of the rule or other article.

The invention comprises a reflector of such a character and so arranged that when the slide rule or other article is supported in a predetermined position with relation thereto, with the front side in a position to be viewed by the observer, the markings on the rear side will be reflected toward the eyes of the observer so that he may read the markings on both sides of the article without changing his position or the position of the article. Preferably means are provided for supporting the slide rule or other article in a definite position with relation to the reflector.

The reflector and the supporting means for the slide rule are preferably mounted on a single supporting structure which may conveniently be in the form of a cabinet of a size to completely enclose the reflector and the slide rule and which has an opening in a side or sides thereof to permit the rule to be viewed by an observer in front of the cabinet, a closure being provided for the opening to completely enclose the device when it is not in use. Obviously the closure may be omitted if desired and it is not essential that the cabinet should be of a length sufficient to enclose the entire rule, although this is preferable.

In that particular embodiment of the invention here illustrated the main supporting structure is in the form of a cabinet comprising a bottom wall 5, a rear wall 6 and triangular end walls, one of which is shown at 7. The front and top walls 8 and 9, of the cabinet are hinged to the rear wall 6 at 10 and constitute a closure adapted to be moved into and out of the closed position shown in dotted lines in Fig. 2. The reflector comprises a combination of mirrors arranged within the cabinet and, in the present instance, consists of a substantially horizontal mirror 11 supported in the lower portion of the cabinet, by a supporting member 12, and an upright mirror 13 extending upwardly adjacent to the rear edge of the horizontal mirror and secured to and supported by the rear wall 6 of the cabinet. The supporting means for the rule or other article preferably consists of two or more brackets, one of which is shown at 14, and which, in the present instance, extend forwardly from the rear wall of the cabinet and have their forward portions inclined, as shown at 15, and provided with recesses 16 adapted to receive the slide rule, which is shown at 17. If desired, suitable means, such as pivoted clips 18, may be provided to positively retain the slide rule in the recesses 16. In the present arrangement the supporting brackets 14 are spaced apart a distance slightly less than the overall length of the rule and are adapted to engage the end portions 19 of the rule beyond the respective ends of the indications or markings thereon. The rule is thus supported in an inclined position with its front side exposed, when the closure is in its open position, and in a position in which the markings thereon are directly visible to and may be read by the operator from his position in front of the cabinet. The rear side of the rule is arranged at such an angle to the horizontal mirror 11 that the markings thereon will be reflected by the horizontal mirror onto the upright mirror and then reflected by the upright mirror across the upper edge of the rule toward the eyes of the operator, the arrangement of mirrors being such that the markings which are in inverted position on the rear side of the rule will be reversed and presented to the eyes of the operator, in the upright mirror 13, in their normal reading positions. Thus the markings on both sides of the rule are simultaneously exposed to the view of the operator from his position in front of the rule. The support for the slide rule is of such a character that it does not in any way interfere with the manipulation of the slide, shown at 20, or of the indicator or indicators, one of which is shown at 21. Therefore, while the rule is supported by the brackets 14 the operator may adjust the slide 20 and the indicator to effect the computation on the front side of the rule, and, without changing his position, may then effect a computation on the rear side of the rule by observing the reflection in the upright mirror, both sides of the rule being simultaneously visible to the operator so that the readings may be compared without changing the position of the operator or of the rule, and, of course, inasmuch as the rule as a whole is not moved there is no danger of the slide being accidentally displaced. It may sometimes be desirable to illuminate the rear side of the rule and this may conveniently be done by providing a lamp so arranged that the light thereof will be directed onto the rear side of the rule, either directly or by the reflector. In the present arrangement, an electric lamp 22 is mounted on the inner side of the closure for the cabinet and so arranged that when the closure is in its open position the lamp will be directly above the horizontal mirror 11.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a device for simultaneously exposing the markings on the front and rear sides of a slide rule, supporting members spaced one from the other, having parts arranged in an inclined plane to engage a slide rule and support the same in a transversely inclined position and having means to retain the rule thereon, and two mirrors supported between said supporting members and to the rear of the position occupied by a rule on said supporting members, said mirrors being arranged in intersecting planes to reflect the markings on the rear side of said rule in reading position across a longitudinal edge of said rule and toward an operator who is in a position to read the markings on the front side of said rule.

2. In a device for simultaneously exposing the markings on the front and rear sides of a slide rule, supporting members spaced one from the other and having parts arranged in an inclined plane to engage the end portions only of a slide rule and support the same in a transversely inclined position in which the movable parts of said rule will be free for manipulation, said supporting members also having means to hold said rule against downward movement thereon, and mirrors supported between said supporting members in the rear of the position occupied by a rule on said supporting members and arranged in intersecting planes to reflect the markings on the rear side of said rule in reading position across a longitudinal edge of said rule and toward an operator who is in a position to read the markings on the front side of said rule.

3. In a device for simultaneously exposing the markings on the front and rear sides of a slide rule, supporting members spaced one from the other and having inclined edge portions to engage the end portions of a slide rule and support the same in a transversely inclined position and also having means to retain said rule in correct position on said edge portions, a substantially horizontal mirror mounted below and to the rear of the position occupied by a rule on said supporting members, and a substantially vertical mirror mounted adjacent to the rear edge of said horizontal mirror and extending upwardly into the line of vision of an operator in front of said rule, whereby the markings on the rear side of said rule will be reflected in reversed position forwardly across the upper edge of said rule.

4. In a device for simultaneously exposing the markings on the front and rear sides of a slide rule, a supporting structure having a substantially horizontal base, supporting members mounted on said base, spaced one from the other and having their forward portions inclined and provided with means for receiving the respective end portions of a slide rule, supporting said rule in a transversely inclined position and holding the same against downward movement on said supporting members, and two mirrors mounted to the rear of the position occupied by a rule on said supporting members, extending for substantially the entire distance between said supporting members and arranged in intersecting planes, said mirrors being so located with relation to said supporting members that the markings on the rear side of the rule on said supporting members will be reflected upwardly and forwardly across the upper edge of said rule.

5. In a device for simultaneously exposing the markings on the front and rear sides of a slide rule, supporting members spaced one from the other and having inclined forward portions provided with recesses to receive the end portions of a slide rule, support said rule in a transversely inclined position and hold the same against downward movement on said supporting members, mirrors mounted to the rear of the position occupied by a rule in said recesses, arranged in intersecting planes and so located with relation to said supporting members that the markings on the rear side of said rule will be reflected upwardly and forwardly across the upper edge of said rule.

6. In a device for simultaneously exposing the markings on the front and rear sides of a rule, a cabinet having a longitudinal opening, means adjacent to the ends of said cabinet to engage the end portions only of said rule and support the same within said cabinet with the markings on the front side thereof in a position to be read through said opening, and two mirrors mounted to the rear of the position occupied by a rule on said supporting means arranged in intersecting planes and so located with relation to said supporting means that they will reflect the markings on the rear side of said rule in reading position toward said opening.

7. In a device for simultaneously exposing the markings on the front and rear sides of a slide rule, a cabinet having an opening formed partially in its front side and partially in its top side and a movable closure for said opening, means for supporting a slide rule within said cabinet in a transversely inclined position with its front side facing said opening, an upright mirror mounted in said cabinet to the rear of the position occupied by a rule on said supporting means and visible through said opening, and a second mirror arranged below and to the rear of said position of said rule and at an acute angle to the plane thereof to reflect the markings on the rear side of said rule onto said upright mirror.

8. In a device for simultaneously exposing the markings on the front and rear sides of a slide rule, a cabinet having an opening formed partially in its front side and partially in its top side and a movable closure for said opening, means for supporting a slide rule within said cabinet in a transversely inclined position with its front side facing said opening, an upright mirror mounted in said cabinet to the rear of the position occupied by a rule on said supporting means and visible through said opening, a second mirror arranged below and to the rear of said position of said rule and at an acute angle to the plane thereof to reflect the markings on the rear side of said rule onto said upright mirror, and a lamp carried by said closure and movable therewith to a position above said second mirror when said closure is moved to its open position.

WILLARD C. POWELL.